Sept. 26, 1961 A. V. KLANCNIK 3,001,422
MACHINE TOOLS
Filed March 2, 1959 3 Sheets-Sheet 3
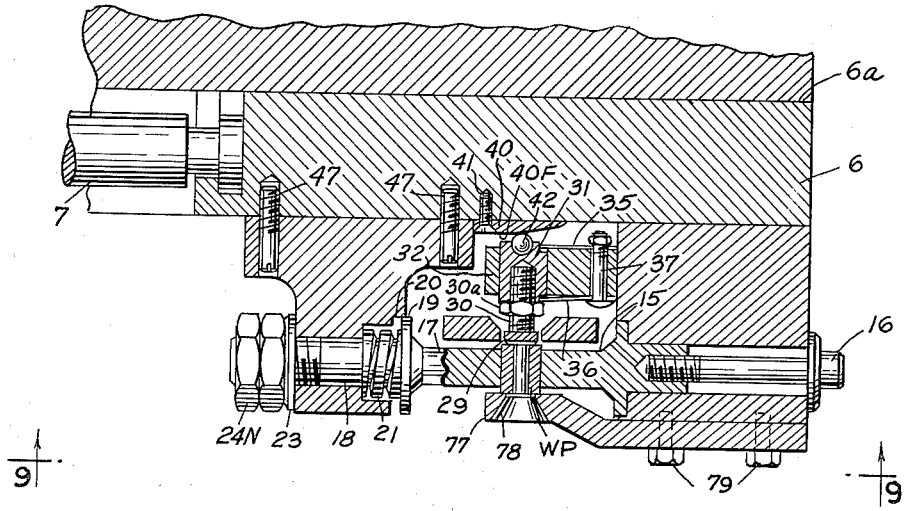
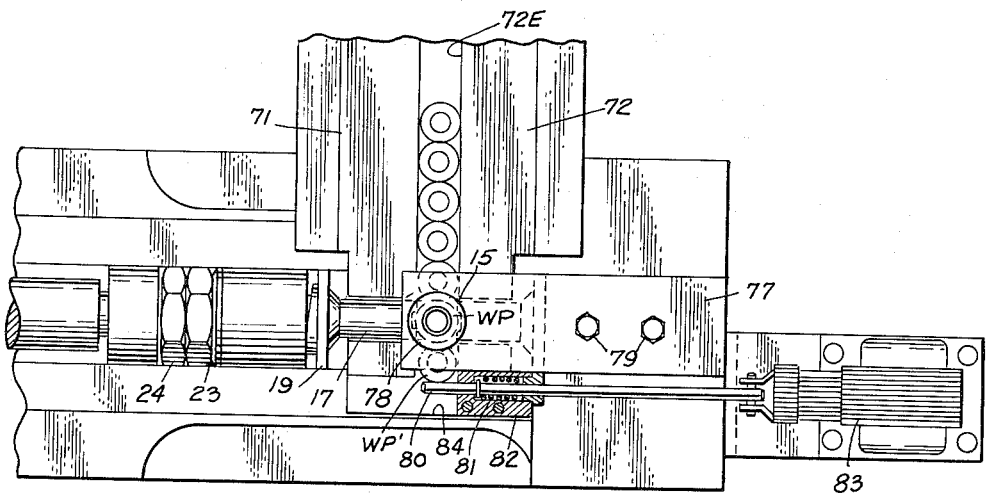
INVENTOR.
ADOLPH V. KLANCNIK
BY
Wallace and Cannon
ATTYS.

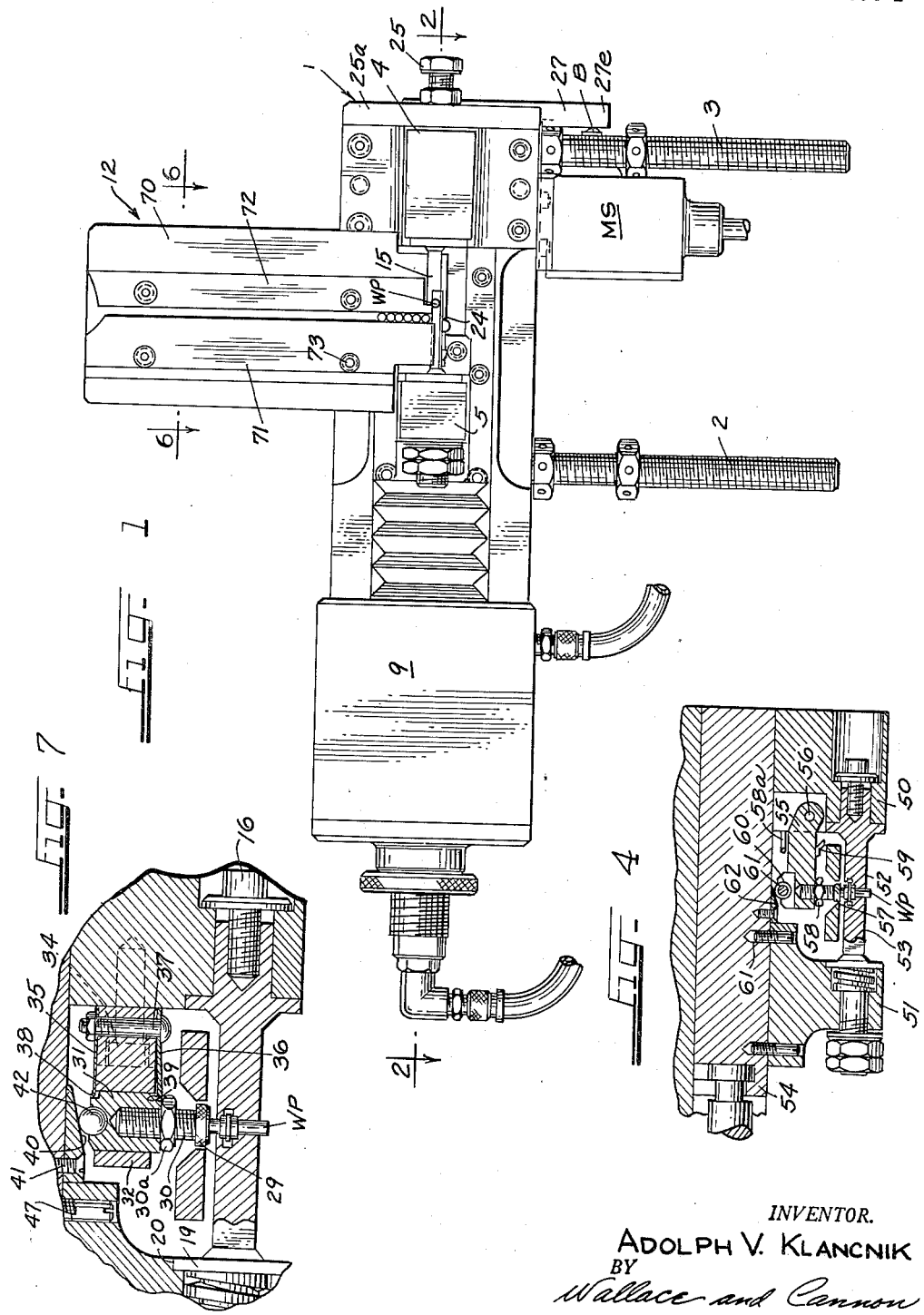

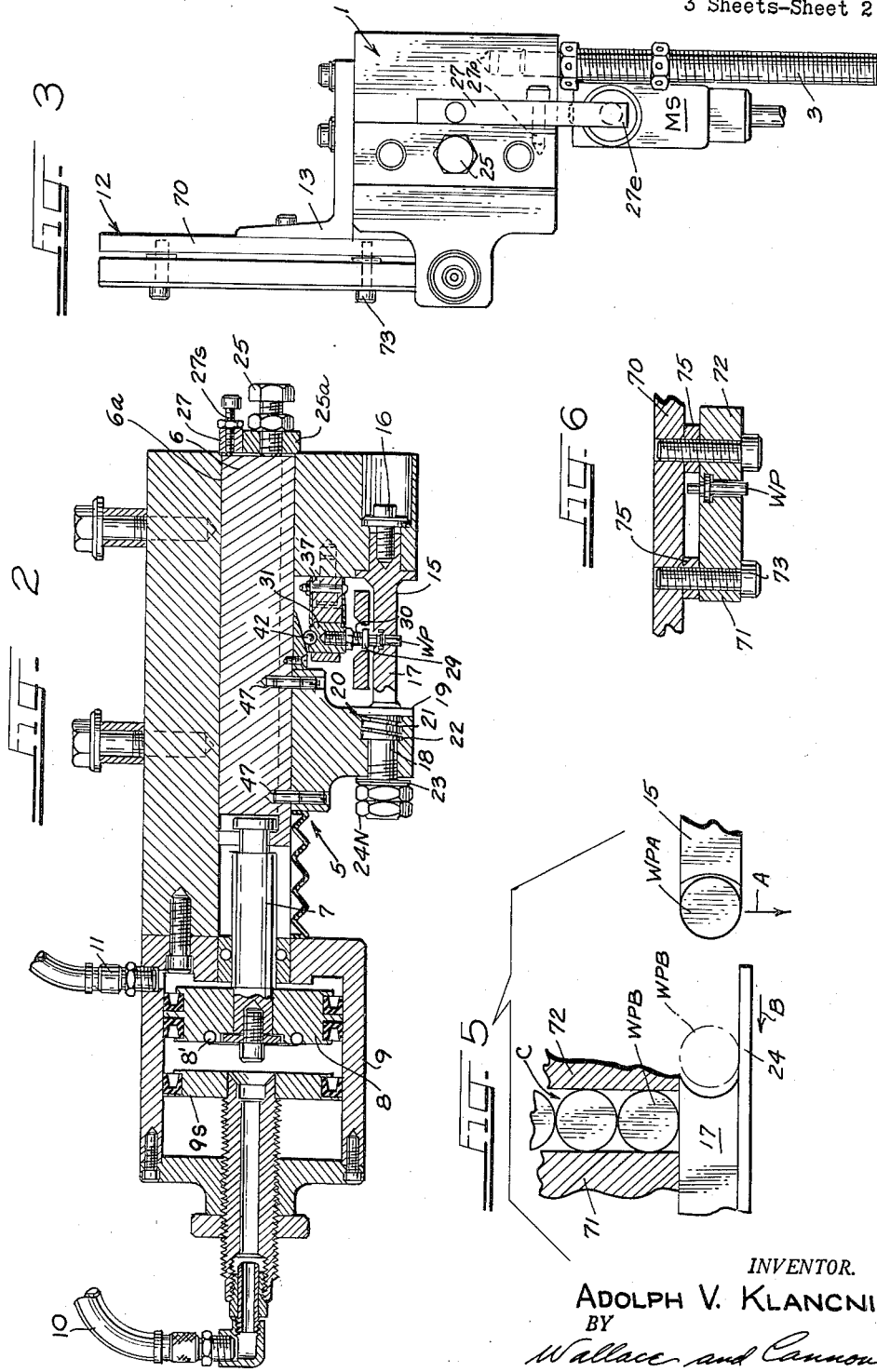

United States Patent Office 3,001,422
Patented Sept. 26, 1961

3,001,422
MACHINE TOOLS
Adolph V. Klancnik, 1020 Glenview Road, Glenview, Ill.
Filed Mar. 2, 1959, Ser. No. 796,634
12 Claims. (Cl. 77—63)

This invention is directed to a work holder for automatic machine tools wherein a tool is mounted for reciprocating movement toward and away from a work piece incidental to tapping, threading, drilling, counterboring, countersinking, pointing and facing, reaming or the like operations performed on the work piece in which operations it may be necessary that the depth of the machining operation be held from either a face or a shoulder of the work piece.

In machine tools of this general character, it is customary to provide a work holder in the form of a fixed jaw and a movable jaw on the machine which cooperate with one another in holding a work piece in a location forward of the drill tool during the reciprocating work performing operation. These jaws may yield a slight amount under the pressure of the reciprocating tool, thus making the holding of tolerance in the hole being formed in the work piece difficult. One of the primary objects of the present invention is to minimize such yieldability of the jaws and enable the work piece to be moved against a precise and definite stop during the machining operation, while at the same time resisting torque which is developed in the work piece during the machining operation.

Another object of the invention is to provide a stop that is automatically moved into back-up relation to a work piece being machined by a drill or similar forming tool.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is an elevational view of apparatus constructed in accordance with the present invention;

FIG. 2 is a section view taken substantially on lines 2—2 of FIG. 1;

FIG. 3 is a side view of the assembly;

FIG. 4 is a sectional view of another embodiment;

FIG. 5 is a schematic view illustrating the action of the work piece carrier;

FIG. 6 is a sectional view taken substantially on line 6—6 of FIG. 1;

FIG. 7 is an enlarged portion of FIG. 2;

FIG. 8 is a modification of the structure shown in FIGS. 2 and 7; and

FIG. 9 is a view taken in the direction of arrows 9—9 in FIG. 8 and illustrates a straight through feeding assembly.

Referring to FIG. 1, a workholder assembly is illustrated as including a supporting member 1 mounted upright on a pair of vertically disposed rods 2 and 3 used for supporting and adjusting the setup of the work holder assembly. The supporting member 1 has a first horizontal jaw member 4 fixedly mounted thereon and a second horizontal jaw member 5 movably mounted thereon. The movable jaw, as will be seen best in FIGS. 2 and 7, is mounted on a slide 6 which travels along a guideway 6a, in the support 1. The slide 6 is connected to the piston rod 7 of a piston 8 arranged for reciprocating movement in a cylinder 9, upon selective application of fluid under pressure, such as air, through conduits 10 and 11. When fluid is delivered to the left-hand end of the cylinder, FIG. 2, the piston is caused to move to the right causing movement of the slide and movable jaw member toward the stationary jaw member. Within the cylinder is an adjustable stop 9S for the piston, and the latter is provided with an O-ring bumper 8' engageable with 9S upon the back or return stroke of piston 8.

The assembly includes an upright magazine 12 carried by a bracket 13, FIG. 3, which is fixed to the support 1. Magazines of this general character are well known to the art and are adapted to allow a gravity feed of work pieces to the space between the fixed and movable jaw, but in an automatic machine of this character, the magazine will automatically feed a work piece in synchronized relation to the opening and closing of the movable jaw as will be explained.

The fixed jaw 4 includes a blank jaw 15, FIG. 2, removably mounted in a bore thereof, a bolt 16 serving to hold the blank jaw 15 in the fixed position illustrated in a manner well known to those skilled in the art. The movable jaw carries a blank jaw 17 resiliently mounted therein. The blank jaw 17 has a shank 18 slidably received in a bore on the movable jaw member, and a boss 19 formed intermediate the shank and the blank jaw is adapted to seat in a recess 20 in the jaw member 5 which faces the fixed jaw. A coil spring 21 or other resilient means, such as rubber, for example, surrounds the shank 18 of the movable blank jaw and is positioned in an enlargement of the recess 20 accommodating the shank as at 22. The outer end of the shank carries a washer 23 and adjustable lock nuts 24N so that the axial position of the washer on the shank may be adjusted. The spring 21 exerts an outward biasing pressure on the boss 19 and thus tends to bias the blank jaw 17 toward the blank jaw 15. The extent of outward movement produced by the spring 22 is regulated by the axial position of the washer 23 on the shank. When the movable jaw is moved away from the fixed jaw as viewed in FIG. 2, the spring will force the boss toward the fixed jaw, that is, to the right as seen in FIG. 2, until the washer 23 abuts against the back side of the movable jaw and prevents further movement. Each of the blank jaws is detachably mounted in their jaw supports so that a set of the blank jaws is easily removed from the jaw supports and a new set inserted on the supports to accommodate a different shape of circular work piece, since each of the blank jaws has an arcuate work piece engaging face shaped to engage complementally and hold a particular work piece of given configuration and dimension such as the circular work piece WP, FIG. 2.

During closing movement of the movable jaw, the blank jaw 17 is outwardly extended with relation to its support 5 so that as its work engaging face moves into contact with a work piece as WP positioned in the space between the two jaws, the spring 21 will be compressed. Thus during the final closing movement of the movable jaw, the work piece will be securely held in position while the spring is compressed and the movable jaw moves to its final work holding position.

The movable jaw includes a work supporting plate or slide carrier 24 which is best illustrated schematically in FIG. 5 and which extends outwardly from the movable blank jaw 17 and towards the other blank jaw 15. The plate 24 is so positioned that when the movable jaw member is retracted, the plate 24 is positioned to receive a new work piece WPB from the magazine as will be explained. Then during the closing movement of the movable jaw this work piece WPB is conveyed on the plate 24 toward the work engaging face of the blank jaw 15 until it contacts this face and is gripped firmly by the two opposed faces of the blank jaws 15 and 17.

In order to limit movement of the slide 6, an adjustable stop in the form of a bolt 25, FIG. 2, is in threaded engagement with a mounting plate 25a fixed to support 1 and is positioned to engage the end of the slide 6 at the desired limit position of its closing movement. By adjusting the bolt 25 in plate 25a, the extent of slide movement is adjusted and accordingly the amount of space between the work engaging faces of the blank jaws 15 and 17 is accurately adjusted. A micro-switch actuating lever 27 is positioned at one side of the plate 25a to be moved by the slide 6 during the end of its movement so as to close the contacts of a microswitch MS, FIGS. 1 and 3, which energizes the tool control circuit which enables the tool to commence its advancing and work performing stroke. Thus, the lever 27 is pivoted on a pin 27p, FIG. 3, with its lower end 27e in position to move against the actuating button B, FIG. 1, of the switch MS. The upper end of the lever 27 carries an adjustable screw 27S, FIG. 2, and it is the end of this screw which is contacted by the slide 6 to cause clockwise switch-closing movement of lever 27 in FIG. 1.

In order to back up a work piece held by the blank jaws and resist turning thereof, when being worked upon by the rotating tool, a stop assembly is positioned between the jaw supports and is so constructed as to move a stop surface 29, FIGS. 2 and 7, into backing relation to the work piece held between the two blank jaws. The stop surface is mounted for movement axially toward and away from the work piece. The stop assembly is shown as including a bolt 30 having the surface on the head thereof adapted to move into contacting and back-up relation to the work piece. Bolt 30 is adjustably mounted in a plunger 31 which in turn is slidably mounted in a supporting block or sleeve 32 fixed to the jaw 4 as by means of a bolt 34. A lock nut 30a may hold the bolt 30 in a selected desired position on its supporting plunger. The plunger 31 is mounted for movement toward and away from the work piece held by the blank jaws as by means of a pair of leaf springs 35 and 36 which are fixed on opposite sides of the block 32 by a tie bolt 37. The ends of the leaf springs 35 and 36 extend over the bore in the sleeve 32 and are adapted for engagement with spaced slots 38 and 39 formed in the plunger 31.

The springs have linear edges which cooperate with correspondingly formed edges 38 and 39 on the plunger 31 to prevent turning of the plunger 31 with respect to the sleeve 32. This is particularly advantageous when adjusting the stop surface 29 with relation to its support. The spring 36 which is positioned nearest to the work piece acts as a return spring for the stop, and when the bolt and plunger 31 move towards the work piece spring 36 is bent away from the support 32 a slight amount as shown in FIG. 2 and it then exerts a biasing pressure tending to pull the stop surface 29 away from the work piece. The spring 35 serves to limit movement of the plunger 31 away from the work piece.

The particular cooperative relation between the leaf springs, plunger and supporting block insures linear movement of the stop surface 29 while limiting such movement to a very small amount, the amount being enough to move out of engagement with the work piece without requiring an excessively long travel.

Camming means are carried by the slide 6 and by the plunger so as to move the stop surface gradually toward and eventually into firm contact with the end of the work piece during the final closing movement of the movable jaw. The camming means includes a wedge plate 40 fixed to the slide as by means of a screw 41, FIG. 7. The aft end of the plunger 31 has a ball 42 rotatably seated therein and adapted to be engaged by the inclined surface of the wedge 40 as the slide 6 moves to its final closed position. Thus, during this final movement of the slide 6, the plunger is forced towards the work piece against the bias of spring 36. By properly adjusting the spaced relation of the stop surface to the plunger 31, the surface may be so positioned at the end of the closing stroke of the slide that it is brought into firm contact with the end of the work piece.

The action of the spring 21 is important from the standpoint of insuring the centering of its work piece along its desired axial center line between the jaw blanks 15 and 17 before the stop surface 29 is brought to bear against the end of the work piece. Thus, scarring of the end of the work piece is avoided since the stop or back-up surface 29 moves into contact with the work piece after the work piece is properly centered, and this advantageous timing action is easily adjusted for different kinds of work pieces. The firm frictional contact between the stop surface and the end of the work piece also resists torque which may be developed in the work piece during the hole forming operation. This is especially important in the case of thin walled work pieces which, although firmly gripped by the clamping faces of the blank jaws, may tend to be easily twisted during the work performing operation of the tool, and of course turning of the work piece during drilling or a like operation can result in imperfect dimensions.

FIG. 4 illustrates another embodiment of the invention. In this embodiment of the invention, the fixed jaw is illustrated at 50 and the movable jaw is illustrated at 51. The fixed and movable jaws carry blank jaws 52 and 53 which are similar in all structural and functional respects to the (blanks) jaws of FIGS. 1 to 3. The movable jaw, FIG. 4, is carried by a fluid motor actuated slide 54 in all respects similar to the slide 6 described above. In this embodiment of the invention, the stop assembly includes a support 55 which is pivotally mounted upon the fixed jaw 50 as by means of the pivot pin 56. The stop or work piece back-up surface in this embodiment of the invention is presented by the end face of a bolt 57 which is adjustably threaded into the support held at a desired position with relation to the work piece WP as by means of a lock nut 58. The stop surface is biased away from the work piece WP as by means of a leaf spring 59 which bears against the support 55. A spring arm 58a is adapted to be contacted by the support 55 so as to limit movement of the support away from the work piece. The support 55 carries a roller 60 journalled for rotation on a pin 61. A wedge having an inclined camming surface 62 is fixed to the slide and cooperable with the roller 60 for forcing the roller and thereby the stop assembly toward the work piece during the final closing movement of the movable jaw.

In both the FIG. 4 and FIG. 7 embodiments of the invention, the work piece is engaged by the blank jaws during the final closing movement of the slide and is held under the resilient pressure of the springs as 21 which bias the movable blank jaws outwardly with relation to their supports. During final closing movement of the jaws, such biasing springs for the blank jaws are compressed until the boss on the movable jaw blank is firmly seated in its recess as 20 in the jaw support, at which time movement of the slide as 6 is stopped and the work piece is firmly held on its opposite sides between the two jaws. During this same final closing movement, the camming surface on the slide cooperates with the camming element on the back-up assembly for moving the back-up surface as 29 to its position in axial back-up relation to the work piece. When the tool is actuated upon closure of the switch MS so that it advances toward and eventually into the work piece, it engages the work piece from the side opposite to the back-up stop, and thus this stop effectively minimizes any yielding or bending of the jaw blanks due to the in-movement of the tool and allows close tolerance in the holes being formed in the work piece. At the same time, the frictional engagement with the end of the work piece resists any torque that is developed in the work piece during the rotating action of the tool.

FIG. 8 illustrates another embodiment of the invention. This embodiment is somewhat similar to that illustrated in FIG. 2 and the like reference numerals refer to like parts. Rather than locating the work piece from a shoulder such as in the FIG. 2 embodiment, the FIG. 8 modification utilizes a bushing plate 77, attached to the stationary jaw 4 by cap screws 79, for locating the work piece WP from the front of the work piece. A tapered hole 78 in the bushing plate 77 permits an operation such as counterboring to be performed. Cam 40 in the FIG. 8 embodiment has a flat dwell portion 40f rather than a continuously inclined face as in FIG. 2.

By suitable adjustment of positioning nut 30a any point on either the inclined or flat surface of cam 40 may be selected as the point at which backing stop 29 will be moved into abutting relation with the back of the work piece WP.

The adjustable stop 25 (FIG. 2) may be positioned to halt movement of slide 6 at any point prior to such compression of the spring 21 as would permit abutment of the boss 19 against the face of the recess 20 or may be positioned to permit such abutment of boss 19 against the face of the recess 20. Thus the force exerted on the sides of the work piece WP can be varied from that due to any partial compression of spring 21 to the full force of the piston 8.

It will be recognized that the incorporation of the flat dwell portion 40f on cam 40 provides considerable flexibility of operation in the selection of the gripping force of jaw 17. The adjusting nut 30a can be turned so that the flat dwell portion is operative to move the backing stop 29 into its operative position. The desired gripping force of jaw 17 on the work piece WP can then be varied by adjustment of stop 25 without any further adjustment of nut 30a.

It should be noted in connection with all the FIGS. 2, 4, and 8 embodiments that the slide 6 is confined on all sides in the slide 6a to give an exceptionally rigid back-up platform. Slide 6a provides a bridging effect like a vise and prevents canting or binding of the slide 6.

Referring now to FIG. 5, the carrier feed for the FIGS. 2 and 7 embodiment is shown in detail. After the tool has performed its work and is retracted from the work piece, the slide actuating fluid motor including the piston 8 automatically retracts the slide by means, not shown, and during this retracting movement the cam surface carried by the slide allows the biasing spring for the back-up support to move away from the finished work piece WPA, FIG. 5. After the back-up surface as 29 or the face of the bolt 57 has cleared the finished work piece WPA, FIG. 5, and is spaced therefrom, as after the initial movement of the slide as to the left in FIG. 2, the biasing spring for the movable blank jaw is extended to its maximum extent. The finished workpiece WPA when the supporting surface 24 thereof has moved to the left as viewed in FIG. 5 (arrow B, FIG. 5) out from beneath the stationary blank jaw and toward the feed channel C, FIG. 5, in the magazine 12, drops as indicated by arrow A in FIG. 5, into the discharge space beneath the jaw blanks to be conveyed away to a receiving station in any suitable conveyor system. In the meantime, the magazine will feed by gravity another work piece on to the supporting plate 24 when jaw blank as 17 clears the feed channel C in magazine 12, and the slide actuating piston is reversed automatically for another work performing cycle in an exceedingly rapid manner.

In this connection, it should be pointed out that in accordance with the present invention the magazine 12 includes a main vertical mounting plate 70, FIGS. 1 and 6, which is the part of the magazine supported by the bracket 13, and on the front side of the main mounting plate 70 are a pair of spaced guide plates 71 and 72 which are removably secured thereto as by cap screws 73. The plates 71 and 72 have spaced inner faces which are recessed as shown in FIG. 6 to complementally receive the particular work pieces WP and define the guide channel referred to above down which the work pieces can slide freely. Suitable spacers 75 are provided between the front surface of the mounting plate 70 and the opposed rear surfaces of the guide plates located forwardly thereof. It will be realized that by removing the plates 71 and 72 and the spacers 75, other guide plates and spacers can be mounted on the mounting plate 70 to accommodate work pieces of differing shape.

FIG. 9 illustrates the gravity feed of the work pieces in the FIG. 8 embodiment and the means for permitting drop out and ejection of the work piece after the forming operation. The FIG. 9 assembly includes a pair of spaced guide plates 71 and 72 like those of the FIG. 5 carrier assembly. As can be seen in FIG. 9, the guide plate 72 has an inner edge 72e substantially aligned with the work piece engaging face of the fixed jaw member 15. A work piece carrier 80 is slidably disposed below the jaw member 15 and in the position illustrated in FIG. 9 is operative to retain the work pieces stationary within the guide plates 71 and 72.

In the operation of the FIG. 9 assembly, the carrier pin 80 is retracted when the spindle of the machine is fully extended and at the bottom of its stroke in the work piece designated at WP. This permits the previous work piece WP' to drop out. As soon as the spindle starts to retract, the solenoid 83 is de-energized and the spring 81 contained within the guide 82 is operative to return the retaining pin 80 to the position illustrated in FIG. 9. As the spindle approaches its fully retracted position, the jaws 15 and 17 open, permitting the work piece WP to drop and be retained by the upper side of the pin 80, thereby taking the position WP'. A subsequent part drops and is retained by the upper edge of work piece WP' thereby becoming the new work piece WP and adequately positioned for the next clamping cycle of jaws 15 and 17. A container (not illustrated) may be provided for receiving such work pieces WP' released by pin 80.

Thus, such retraction and return of retaining pin 80 by the solenoid 83 and the spring 81 permits removal of a formed work piece from the forming station between the jaws 15 and 17, and also acts as an adequate positioner for the subsequent part.

Hence, while I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A work support for reciprocatory machine tools, including a support and a pair of work engaging jaws mounted on said support, one of said jaws being fixedly mounted on said support and the other jaw being carried by a slide on said support for movement toward and away from said fixed jaw, power means for moving said slide and said movable jaw toward said fixed jaw so as to clamp and hold a work piece in said jaws, a stop movably mounted on said fixed jaw and adapted for movement into backing relation to a work piece engaged by said jaws, and camming means for moving said stop toward said work piece including a camming surface having an inclined portion and a flat dwell portion movable with said slide and engageable with a cooperable camming member carried by said stop during final closing movement of said movable jaw, and means biasing said stop away from said jaws.

2. A work support for reciprocatory machine tools, including a support and a pair of work engaging jaws mounted on said support, one of said jaws being fixedly mounted on said support and the other jaw being carried by a slide on said support for movement toward and away from said fixed jaw, power means for moving said slide and said movable jaw toward said fixed jaw so as to clamp and hold a work piece in said jaws, a stop pivotally mounted on said fixed jaw and adapted for movement into backing relation to a work piece engaged by said jaws, camming means for moving said stop toward said work piece including an inclined camming surface movable with said slide and engageable with a cooperable camming member carried by said stop during final closing movement of said movable jaw, and means biasing said stop away from said jaws.

3. A work support for reciprocatory machine tools, including a support and a pair of work engaging jaws mounted on said support, one of said jaws being fixedly mounted on said support and the other jaw being carried by a slide on said support for movement toward and away from said fixed jaw, power means for moving said slide and said movable jaw toward said fixed jaw so as to clamp and hold a work piece in said jaws, a member carried by said fixed jaw, a stop slidably mounted in said member and adapted for movement into backing relation to a work piece engaged by said jaws, camming means for moving said stop toward said work piece including an inclined camming surface movable with said slide and engageable with a cooperable camming member carried by said stop during final closing movement of said movable jaw, and means biasing said stop away from said jaws including a pair of leaf springs with rectilinear edges in engagement with rectilinear edges on said stop.

4. A work support for reciprocatory machine tools, including a support and a pair of work engaging jaws mounted on said support, one of said jaws being fixedly mounted on said support and the other jaw being carried by a slide on said support for movement toward and away from said fixed jaw, power means for moving said slide and said movable jaw toward said fixed jaw so as to clamp and hold a work piece in said jaws, a stop including a camming member, said stop being movably mounted on said fixed jaw and adapted for movement into backing relation to a work piece engaged by said jaws, camming means for moving said stop toward said work piece including an inclined camming surface movable with said slide and engageable with the camming member carried by said stop during final closing movement of said movable jaw, and means biasing said stop away from said jaws, said stop including a first member and a second member in threaded adjustable engagement with one another, said first member having a stop surface facing the space between said jaws, and said second member being movably mounted on said fixed jaw and supporting said camming member.

5. In a work holder for machine tools, a support and a pair of clamping jaws mounted on said support, one of said jaws being fixed to said support and the other jaw being mounted on said support for movement toward and away from said first jaw, said jaws having faces adapted to grip and hold opposite sides of a work piece therebetween, means for moving the movable jaw toward said fixed jaw, a backing stop mounted for axial movement in a direction transverse to the direction of movement of the movable jaw toward and away from an end of a work piece held by said jaws when said jaws are in clamping engagement with said work piece, and means moving said backing stop towards said jaws to a position in backing position to a work piece held by said jaws and rigidly holding it at that position in response to final closing movement of said movable jaw, said movable jaw including a first member slidably mounted on said support and having a recess formed therein, a second member movably mounted on the first member and having both a clamping face and a boss formed thereon, a coil spring seated in said recess and engaged with the boss on the second member for resiliently biasing the second member toward the fixed jaw, said boss being adapted progressively to compress said spring upon closing movement of said movable jaw, and stop means for limiting movement of the movable jaw toward the fixed jaw, said stop means being adjustable to prevent contact of said boss with said first member.

6. A work holder for a machine tool of the kind in which work pieces are sequentially fed from a magazine to a working station and are retained in position at the working station by the work holder while a machining operation is performed on an end portion of the work piece, said work holder comprising a support and a pair of clamping jaws mounted on the support, one of said jaws being movable toward and away from the other jaw to grip and release opposite sides of a work piece at the working station, a backing stop movable generally axially of a work piece at the working station in a direction transverse to both the direction of movement of the movable jaw and the direction of feeding movement of the work piece in the magazine and into abutting engagement with an end surface of the work piece opposite the end portion to be machined for maintaining the work piece in fixed axial position between the clamping jaws during the machining operation, and means for moving said backing stop axially into said abutting engagement with the end of the work piece in coordination with closing movement of the movable jaw.

7. A work holder as defined in claim 6 wherein said movable jaw includes a first member slidably mounted on said support, a second member movably mounted on said first member and resilient means biasing the second member toward the other jaw.

8. A work holder as defined in claim 6 wherein said movable jaw includes a first member slidably mounted on said support, a second member movably mounted on said first member and resilient means biasing the second member toward the other jaw, said resilient means including a coiled spring seated in a recess in said first member and abutting against a boss on said second member, said boss being adapted to compress said spring and move into firm abutting contact with a portion of said first member at the end of closing movement of said movable jaw.

9. A work holder as defined in claim 6 wherein said movable jaw includes a first member slidably mounted on said support, a second member movably mounted on said first member and resilient means biasing the second member toward the other jaw, and wherein said work holder includes adjustable stop means for limiting movement of the movable jaw toward the other jaw to regulate the biasing force exerted on the second member in the work piece clamping position of the clamping jaws.

10. A work holder as defined in claim 6 wherein said movable jaw includes a first member slidably mounted on said support, a second member movably mounted on said first member, resilient means biasing the second member toward the other jaw, and adjustable means for limiting the movement of said second member away from said first member.

11. A work holder as defined in claim 6 wherein said means for moving said backing stop includes a cam member movable with the movable jaw.

12. A work holder as defined in claim 6 including biasing means for biasing said backing stop away from the clamping jaws and wherein said means for moving said backing stop include a cam member movable with the movable jaw.

References Cited in the file of this patent

UNITED STATES PATENTS

| | | |
|---|---|---|
| 638,835 | Coran | Dec. 12, 1899 |
| 1,499,989 | Lehmann | July 1, 1924 |
| 1,951,093 | Johnston | Mar. 13, 1934 |
| 2,622,488 | Payne | Dec. 23, 1952 |
| 2,811,876 | Batchelder | Nov. 5, 1957 |

FOREIGN PATENTS

| | | |
|---|---|---|
| 442,016 | Italy | Nov. 15, 1948 |
| 767,653 | France | May 7, 1934 |